US011955006B2

(12) United States Patent
Vijaya Kumar et al.

(10) Patent No.: US 11,955,006 B2
(45) Date of Patent: Apr. 9, 2024

(54) TRAFFIC LIGHT INDICATION SYSTEM WITH SUPPRESSED NOTIFICATION FOR A VEHICLE

(71) Applicant: GM Global Technology Operations LLC, Detroit, MI (US)

(72) Inventors: Vivek Vijaya Kumar, Shelby Township, MI (US); Mohammad Naserian, Windsor (CA); Dustin Howard Malcom Smith, Clarkston, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 9 days.

(21) Appl. No.: 17/820,307

(22) Filed: Aug. 17, 2022

(65) Prior Publication Data

US 2024/0062652 A1 Feb. 22, 2024

(51) Int. Cl.

*G08G 1/07* (2006.01)
*G08G 1/04* (2006.01)
*G08G 1/09* (2006.01)
*G08G 1/16* (2006.01)

(52) U.S. Cl.

CPC ............... *G08G 1/091* (2013.01); *G08G 1/04* (2013.01); *G08G 1/16* (2013.01)

(58) Field of Classification Search

None

See application file for complete search history.

(56) References Cited

U.S. PATENT DOCUMENTS 6,064,319 A * 5/2000 Matta ..................... G08G 1/087 701/1
6,326,903 B1 * 12/2001 Gross ..................... G08G 1/087 340/988
2012/0038490 A1 * 2/2012 Verfuerth ................ G08G 1/04 340/917

* cited by examiner

*Primary Examiner* — John F Mortell
(74) *Attorney, Agent, or Firm* — Vivacqua Crane PLLC

(57) ABSTRACT

A vehicle includes a traffic light indication system (system) with one or more input devices for generating a status input signal associated with a status of a traffic light. The input devices further generate an overriding input signal associated with a hazardous driving condition. The system further includes a notification device for providing a traffic light notification to the user. The system further includes a computer having a processor and a non-transitory computer readable storage medium (CRM) storing instructions. The processor is programmed to generate an actuation signal based on the status input signal. The processor is further programmed to refrain from generating the actuation signal, in response to the processor determining the predicted collision based on the status input signal and the overriding input signal. The notification device provides the traffic light notification to the user, in response to the notification device receiving the actuation signal.

17 Claims, 7 Drawing Sheets

TRAFFIC LIGHT INDICATION SYSTEM WITH SUPPRESSED NOTIFICATION FOR A VEHICLE

INTRODUCTION

The present disclosure relates to a traffic light indication system that provides a notifications of a status of a traffic light associated with a vehicle, and more particularly to a traffic light indication system that refrains from providing the traffic light notifications to enable a user to focus attention on a hazardous driving condition.

Traffic light indication systems for vehicles may have Vehicle-To-Infrastructure connectivity (V2I connectivity) to instruct a user on how to drive a vehicle based on a status of the traffic light. For example, the system may include a notification device for providing a notification of the status of the traffic light and an associated instruction (e.g., countdown for amount of time that the traffic light remains one color before changing to another color and an associated instruction to operate the vehicle when the countdown expires, an inattentive driver alert to indicate that the traffic light has already changed color and an associated instruction to immediately operate the vehicle). However, the notification device may provide the traffic light notification when one or more hazardous driving conditions may require the driver to refrain from driving the vehicle pursuant to the associated instructions (e.g., traffic light has turned green but pedestrians are located in the crosswalk are blocking the vehicle path, etc.). As a result, the uninterrupted notifications may cause user anxiety or annoyance, which can in turn cause the user to impulsively comply with the associated instructions. Furthermore, the uninterrupted notifications may result in increased consumption of battery resources, processing resources, memory resources, time domain resources, and/or frequency domain resources of the vehicle among other examples.

Thus, while existing traffic light indication systems achieve their intended purpose, there is a need for a new and improved traffic light indication system with suppressed notification that addresses these issues.

SUMMARY

According to several aspects of the present disclosure, a vehicle includes a traffic light indication system (system) having one or more input devices for generating a status input signal associated with a status of a traffic light. The input devices further generate an overriding input signal associated with a hazardous driving condition. The system further includes one or more notification devices for providing a traffic light notification to the user. The system further includes a computer having one or more processors electronically connected to the input devices and the notification devices. The computer further includes a non-transitory computer readable storage medium (CRM) storing instructions, such that the processor is programmed to receive the status input signal and the overriding input signal from the input devices. The processor is further programmed to generate an actuation signal based on the status input signal. The processor is further programmed to determine a predicted collision with the vehicle, in response to the processor receiving the status input signal and the overriding input signal from the input device. The processor is further programmed to refrain from generating the actuation signal, in response to the processor determining the predicted collision with the vehicle. The notification device provides the traffic light notification to the user, in response to the notification device receiving the actuation signal from the processor.

In one aspect, the input device includes a telematics module, and the overriding input signal includes a Vehicle-To-Everything message (V2X message) associated with a Personal Safety message (PS message) transmitted from the telematics module to the processor. The PS message is associated with a location of a crosswalk, a location of a Vulnerable Road User (VRU) relative to the crosswalk, a speed of the VRU, a heading of the VRU, and/or a pedestrian signal light status.

In another aspect, the input device further includes an onboard objection detection device (OODD) generating the overriding input signal, with the overriding input signal being associated with data indicating a location of the VRU relative to the vehicle, a heading of the VRU relative to the vehicle, and/or a range rate of the VRU relative to the vehicle.

In another aspect, the OODD is a short range radar sensor, a Light Detection and Ranging sensor (LiDAR sensor), a Millimeter-Wave Radar sensor (MWR sensor), an infrared camera (IR camera), and/or a stereo vision camera.

In another aspect, the input device further includes a driver monitoring device for generating the overriding input signal, with the overriding input signal being associated with data indicating a direction of a user gaze relative to the traffic light and/or the VRU. The processor determines the predicted collision with the vehicle, in response to the processor determining that the direction of the user gaze is toward the traffic light and/or the VRU based on the overriding input signal.

In another aspect, the overriding input signal is associated with a velocity of the vehicle. The processor determines the predicted collision with the vehicle, in response to the processor determining that the velocity is below a velocity threshold.

In another aspect, the overriding input signal is associated with a change in a brake pedal position. The processor determines the predicted collision with the vehicle, in response to the processor determining that the change in the brake pedal position is below a brake pedal threshold.

In another aspect, the overriding input signal is associated with a change in an accelerator pedal position. The processor determines the predicted collision with the vehicle, in response to the processor determining that the change in the accelerator pedal position is above an accelerator pedal threshold.

In another aspect, the overriding input signal is associated with a rate of change in a steering wheel angle position. The processor determines the predicted collision with the vehicle, in response to the processor determining that the rate of change in the steering wheel angle position is below a steering rate threshold.

In another aspect, the overriding input signal is the V2X message associated with a Road Safety Message (RS message) transmitted from the telematics module to the processor. The RS message is associated with a work zone start location, a work zone end location, a lane closure, and/or a location of a worker.

In another aspect, the OODD generates the overriding input signal. The overriding input signal is associated with a location of a construction sign, a construction barrel, and/or the worker relative to the vehicle and a heading of the worker relative to the vehicle.

In another aspect, the overriding input signal is the V2X message associated with a vehicle message transmitted from the telematics module to the processor. The vehicle message is associated with a location of a third party vehicle, a heading of the third party vehicle, a speed of the third party vehicle, an acceleration of the third party vehicle, and/or a predicted collision with the vehicle based on the heading and the location of the third party vehicle.

In another aspect, the OODD generates the overriding input signal. The overriding input signal is associated with a location of the third party vehicle relative to the vehicle, a heading of the third party vehicle relative to the vehicle, a speed of the third party vehicle relative to the vehicle, an acceleration of the third party vehicle relative to the vehicle, a wiper device of the third party vehicle and/or the vehicle being activated, an anti-lock braking system of the third party vehicle and/or the vehicle being activated, and/or a predicted collision with the vehicle based on the heading and the location of the third party vehicle relative to the vehicle.

In another aspect, the notification device includes an Augmented Reality Head Up Display device (ARHUD device) and/or a haptic steering wheel.

According to several aspects of the present disclosure, a computer is provided for a traffic light indication system (system) of a vehicle. The system includes one or more input devices for generating a status input signal associated with a status of a traffic light. The input devices further generate an overriding input signal associated with a hazardous driving condition. The system further includes one or more notification devices for providing a traffic light notification to the user. The computer includes one or more processors electronically connected to the input devices and the notification devices. The computer further includes a non-transitory computer readable storage medium (CRM) storing instructions, such that the processor is programmed to receive a status input signal and an overriding input signal from the input device. The processor is further programmed to generate an actuation signal based on the status input signal. The processor is further programmed to determine a predicted collision with the vehicle, in response to the processor receiving the status input signal and the overriding input signal from the input device. The processor is further programmed to refrain from generating the actuation signal, in response to the processor determining the predicted collision with the vehicle. The notification device provides a traffic light notification to the user, in response to the notification device receiving the actuation signal from the processor.

In one aspect, the overriding input signal is a Vehicle-To-Everything message (V2X message) associated with a Personal Safety message (PS message) that is transmitted from a telematics module to the processor. The PS message is associated with a location of a crosswalk, a location of a Vulnerable Road User (VRU) relative to the crosswalk, a speed of the VRU, a heading of the VRU, and/or a pedestrian signal light status.

In another aspect, the overriding input signal is associated with a location of the VRU relative to the vehicle, a heading of the VRU relative to the vehicle, and a range rate of the VRU relative to the vehicle.

According to several aspects of the present disclosure, a method is provided for operating a vehicle having a traffic light indicating system. The method includes generating, using the input device, a status input signal associated with a status of a traffic light. The method further includes generating, using the input device, an overriding input signal associated with a hazardous driving condition. The method further includes receiving, with the processor of a computer, the status input signal and the overriding input signal from the input device. The method further includes generating, using the processor, an actuation signal based on the status input signal. The method further includes providing, using the notification device, a traffic light notification to the user in response to the notification device receiving the actuation signal from the processor. The method further includes determining, using the processor, a predicted collision with the vehicle in response to the processor receiving the status input signal and the overriding input signal from the input device. The method further includes refraining from generating, using the processor, the actuation signal in response to the processor determining the predicted collision with the vehicle. The method further includes providing, using the notification device, the traffic light notification to the user in response to the notification device receiving the actuation signal from the processor.

In one aspect, the method further includes transmitting, using the input device in the form of a telematics module, to the processor with the overriding input signal being a Vehicle-To-Everything message (V2X message) associated with a Personal Safety message (PS message). The PS message is associated with a location of a crosswalk, a location of a Vulnerable Road User (VRU) relative to the crosswalk, a speed of the VRU, a heading of the VRU, and/or a pedestrian signal light status.

In another aspect, the method further includes transmitting, using the telematics module, the V2X message associated with a vehicle message to the processor. The vehicle message is associated with a location of a third party vehicle, a heading of the third party vehicle, a speed of the third party vehicle, an acceleration of the third party vehicle, and/or a predicted collision with the vehicle based on the heading and the location of the third party vehicle.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
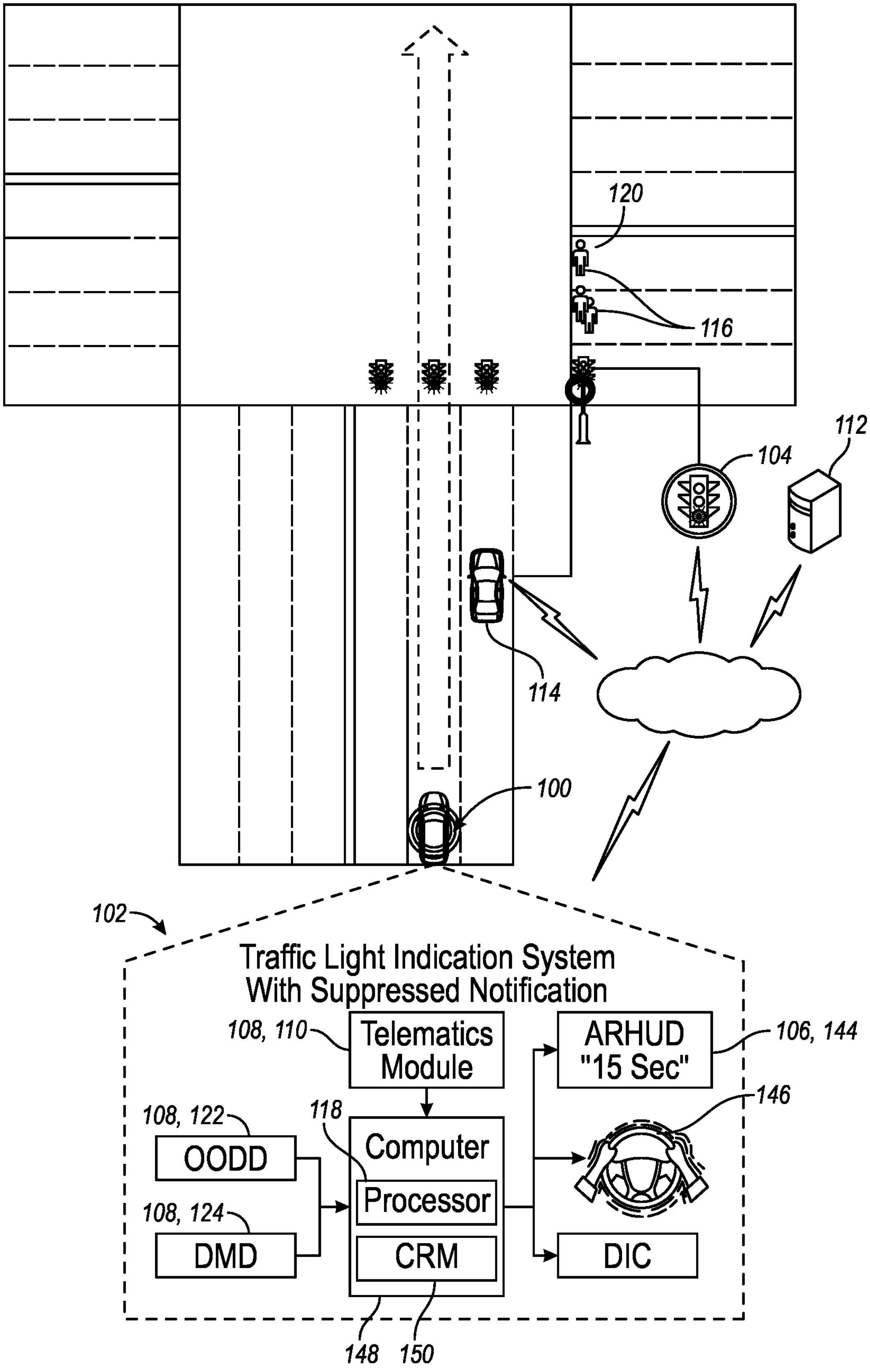
FIG. 1 is a schematic view of one example of a vehicle having a traffic light indication system with notification suppression, illustrating the traffic light indication system providing a notification of a status of the traffic light.

The following description is merely exemplary in nature and is not intended to limit the present disclosure, application, or uses.

The present disclosure describes one example of a vehicle 100 with a traffic light indication system 102 (system), which provides a notification about a status of a traffic light 104 and suppresses the traffic light notification in response to the system 102 determining a hazardous driving condition. As described in detail below, the system 102 includes a notification device 106 (e.g., an ARHUD 144, a haptic steering wheel 146, a Driver Information Center (DIC), a speaker, any suitable Human Machine Interface (HMI), etc.) that provides the traffic light notification for prompting a user (e.g., a vehicle occupant, such as a driver and/or a passenger, a remote operator, etc.), to maneuver or prepare to maneuver the vehicle 100 (e.g., a real-time countdown for the amount of time that a traffic light remains one color before changing to another color, an audio and/or haptic alert to indicate an imminent change and/or a completed change from one color to another color, etc.). The notification device 106 refrains from providing the traffic light notification, in response to the system 102 determining the hazardous driving condition (e.g., a Vulnerable Road User (VRU) being located in or approaching a path of the vehicle; a work zone being located in the path of the vehicle; another vehicle, such as an Emergency Vehicle (EV), being located in or approaching the path of the vehicle; another vehicle being located in the path of the vehicle; another vehicle approaching the path of the vehicle on slippery road conditions; fog density being above a predetermined fog threshold, etc.). Suppressing the traffic light notifications allows the user to focus attention on the hazardous driving condition and take an associated action, which may contradict an instruction prompted by the traffic light notification. As a result, suppressing the traffic light notifications can prevent the user from being distracted or annoyed by the system. Furthermore, suppressing the traffic light notifications based on hazardous driving conditions can result in a decreased consumption of battery resources, processing resources, memory resources, and/or network resources (e.g., time domain resources and/or frequency domain resources) used to provide the traffic light notifications.

Referring to FIG. 1, one non-limiting example of the vehicle 100 having the traffic light indication system 102 (system) includes one or more input devices 108 (e.g., an Onboard Object Detection Device 122 (OODD), a Driver Monitoring Device 124 (DMD), an Anti-lock Braking System 138 (ABS), a Traction Control System 140 (TCS), a wiper device 152, etc.). The input devices 108 may include associated Vehicle-To-Everything connectivity (V2X connectivity), Vehicle-To-Infrastructure connectivity (V2I connectivity), Vehicle-To-Vehicle connectivity (V2V connectivity), and/or on-board sensors for generating a status input signal associated with a status of a traffic light 104. As described in detail below, the system 102 provides a notification about the status of the traffic light 104 to the user based on the status input signal. The input devices 108 may include a telematics module 110 wirelessly connected to a remote server 112 and/or one or more remote vehicles 114. The telematics module 110 may receive a remote signal from the remote server 112 and/or one or more remote vehicles 114. The remote signal may be associated with a SPaT message (A Signal Phase and Timing message) that defines a current intersection signal light phase, a current signal state and current signal time until change. The remote signal may be further associated with a MAP message that defines a geometry of an associated intersection. The telematics module 110 may generate the status input signal based on the remote signal.

Figure 2:
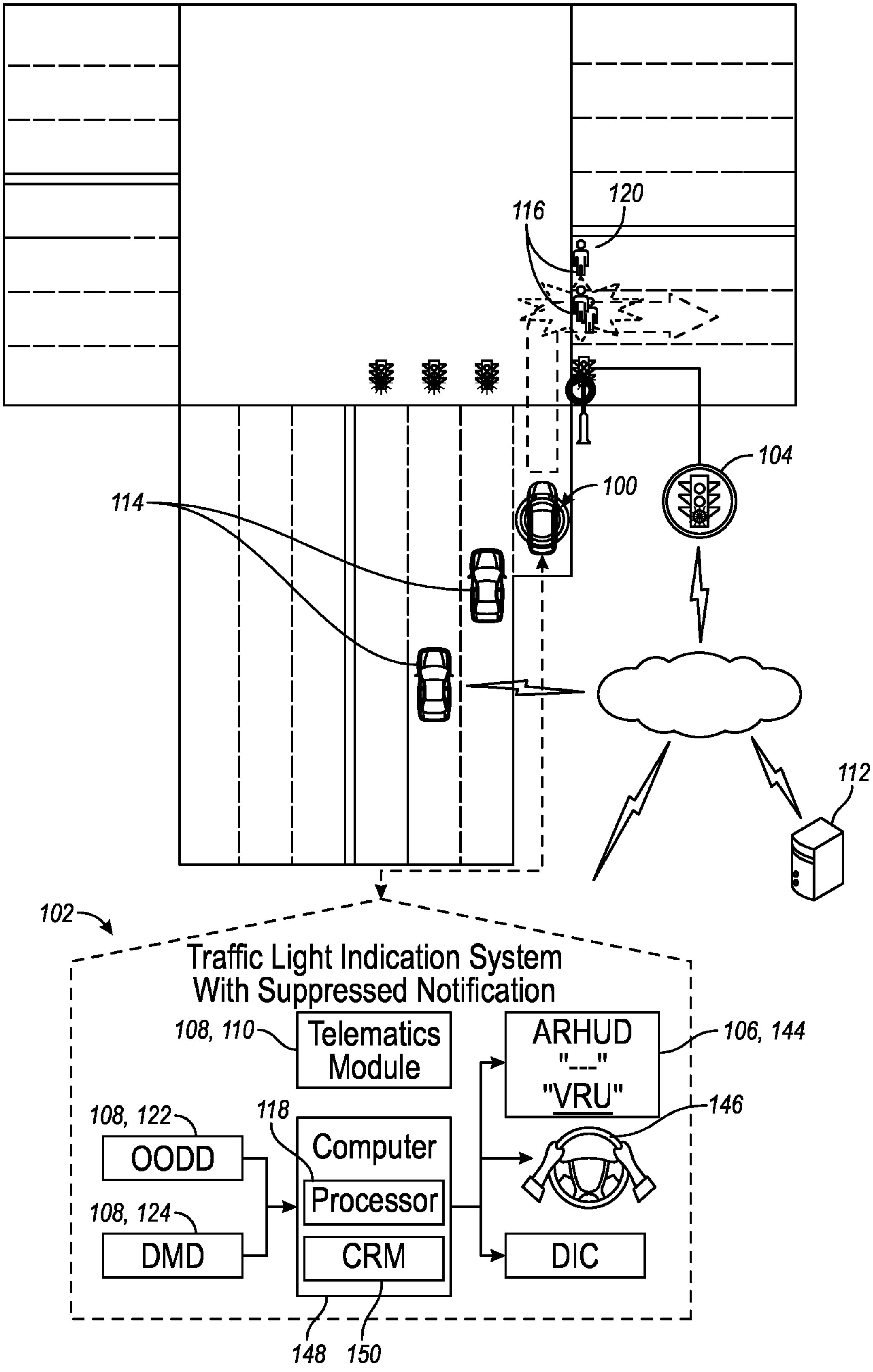
FIG. 2 is a schematic view of one example of the vehicle of FIG. 1, illustrating the system suppressing the traffic light notification in response to the system determining a hazardous driving condition in the form of a pedestrian positioned in a path of the vehicle.

Referring to FIG. 2, the input devices 108 may further generate an overriding input signal for suppressing the traffic light notification as described in detail below. In one non-limiting example, the overriding input signal may be a Vehicle-To-Everything message (V2X message) associated with a Personal Safety message (PS message) for a Vulnerable Road User 116 (VRU) (e.g., individuals located on or alongside a roadway without the protective rigid covering of a metal automobile, such as a pedestrian, a roadway worker, an individual operating a wheelchair or other personal mobility device, whether motorized or not, an individual operating an electric scooter or the like, an individual operating a bicycle or other non-motorized means of transportation, and individuals operating a motorcycle, etc.). The PS message may be transmitted from the telematics module 110 to a processor 118 as described in detail below. The PS message may be associated with a location of a crosswalk 120, a location of the VRU 116 relative to the crosswalk 120, a speed of the VRU 116, a heading of the VRU 116, and/or a pedestrian signal light status, among other examples. The input devices 108 may further include the OODD 122 for generating the overriding input signal, with the overriding input signal being associated with data indicating a location of the VRU 116 relative to the vehicle 100, a heading of the VRU 116 relative to the vehicle 100, and/or a range rate of the VRU relative to the vehicle, among other examples. Non-limiting examples of the OODD 122 may include a short range radar sensor, a Light Detection and Ranging sensor (LiDAR sensor), a Millimeter-Wave Radar sensor (MWR sensor), an infrared camera (IR camera), and a stereo vision camera, among other examples.

The input devices 108 may further include a Driver Monitoring Device 124 (DMD) for generating the overriding input signal, with the overriding input signal being associated with data indicating a direction of a user gaze relative to the traffic light and/or the VRU 116. The overriding input signal may be further associated with a velocity of the vehicle 100, a change in a brake pedal position of the vehicle 100, a change in an accelerator pedal position of the vehicle 100, a rate of change in a steering wheel angle position of the vehicle 100, among other examples.

Figure 3:
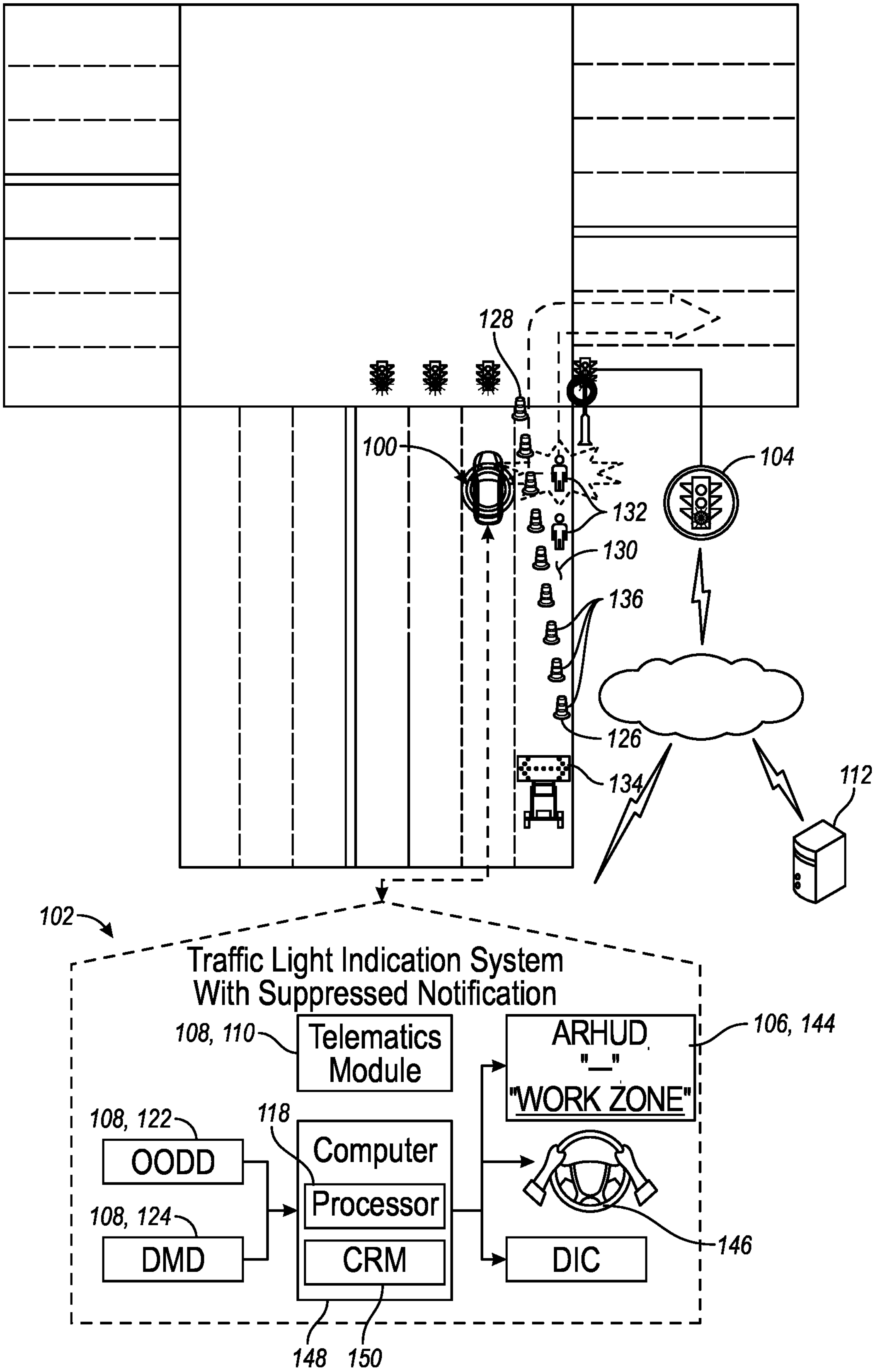
FIG. 3 is a schematic view of one example of the vehicle of FIG. 1, illustrating the system suppressing the traffic light notification in response to the system determining a hazardous driving condition in the form of a work zone positioned in a path of the vehicle.

Referring to FIG. 3, the input devices 108 may further generate the overriding input signal, with the overriding input signal being a V2X message in the form of a Road Safety Message (RS message) transmitted from the telematics module 110 to the processor 118. The RS message may be associated with data indicating the presence of a work zone (e.g., one or more construction barrels, traffic cones, roadside flares, road barricades, construction equipment, utility vehicles, emergency vehicles, one or more individuals within the work zone, such as construction workers, utility technicians, first responders, etc.). More specifically, the RS message may be associated with a work zone start location

126, a work zone end location 128, a lane closure 130, and/or a location of one or more workers 132 among other examples. The OODD 122 may generate the overriding input signal, with the overriding input signal being associated with data indicating a location of a construction sign 134, a construction barrel 136, locations of the workers 132 relative to the vehicle 100, and/or a heading of the workers 132 relative to the vehicle 100 among other examples.

Figure 4:
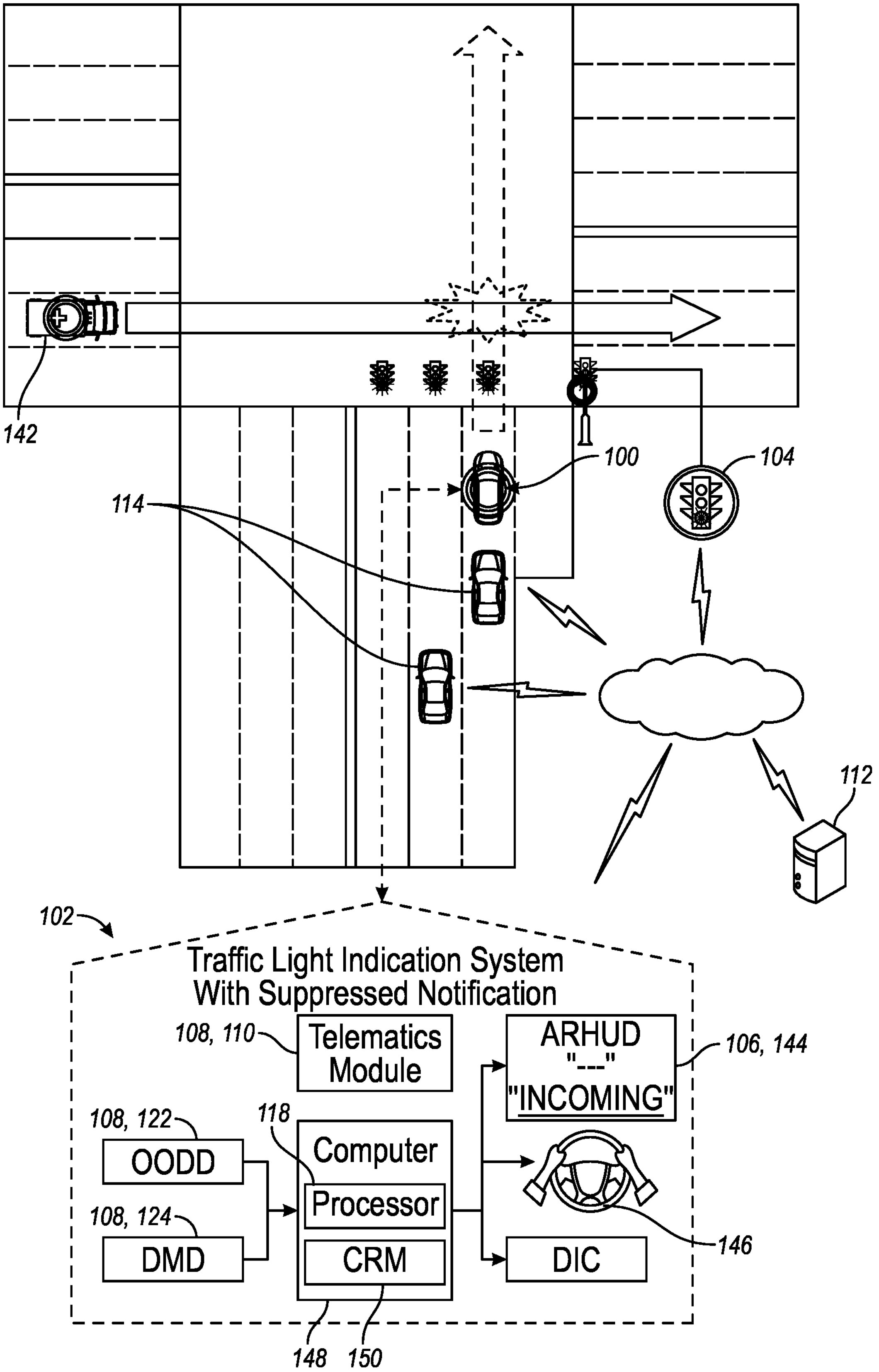
FIG. 4 is a schematic view of one example of the vehicle of FIG. 1, illustrating the system suppressing the traffic light notification in response to the system determining a hazardous driving condition in the form of an emergency vehicle approaching a path of the vehicle.
Figure 5:
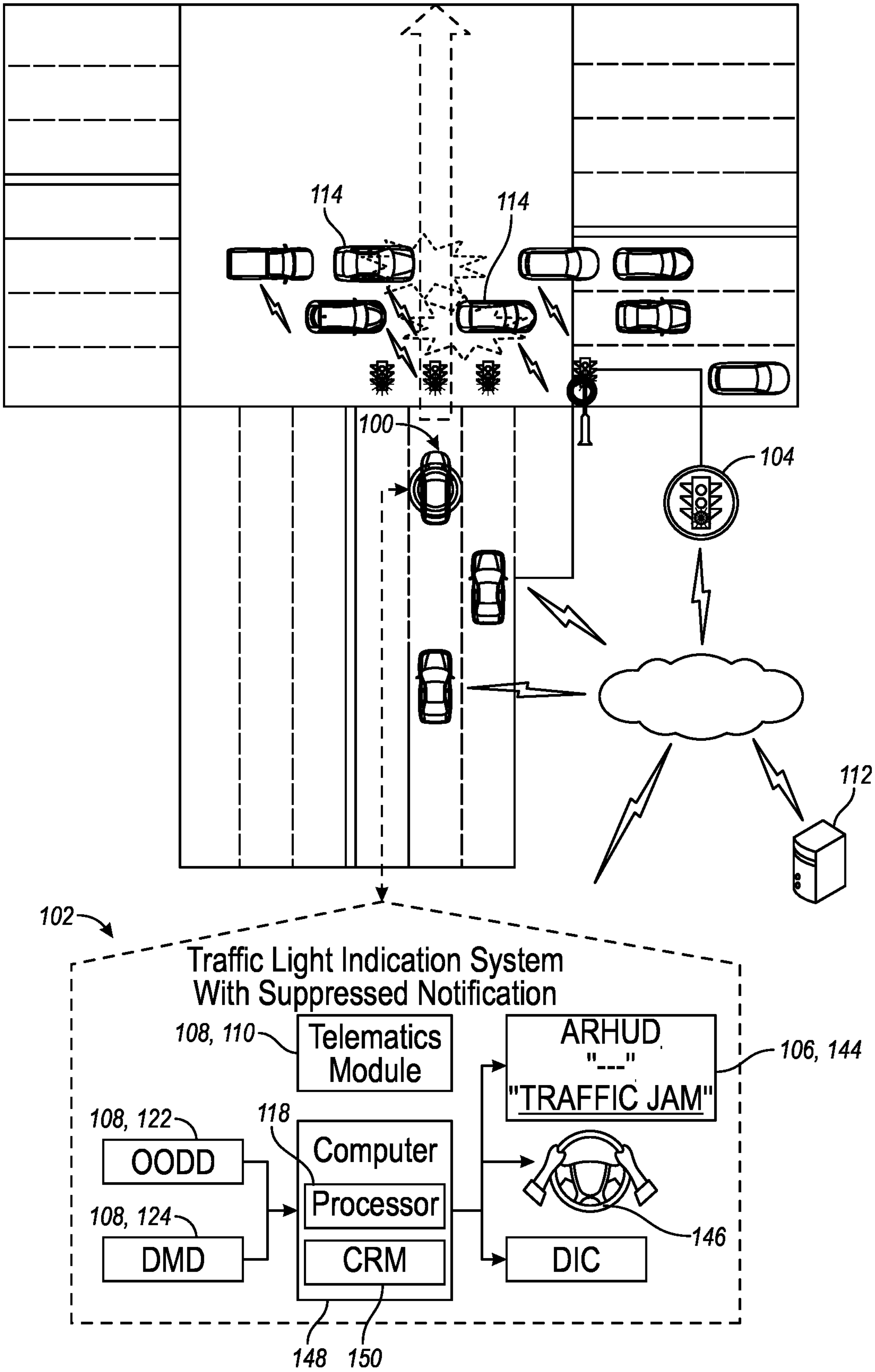
FIG. 5 is a schematic view of one example of the vehicle of FIG. 1, illustrating the system suppressing the traffic light notification in response to the system determining a hazardous driving condition in the form of a backup of other vehicles positioned within a path of the vehicle.
Figure 6:
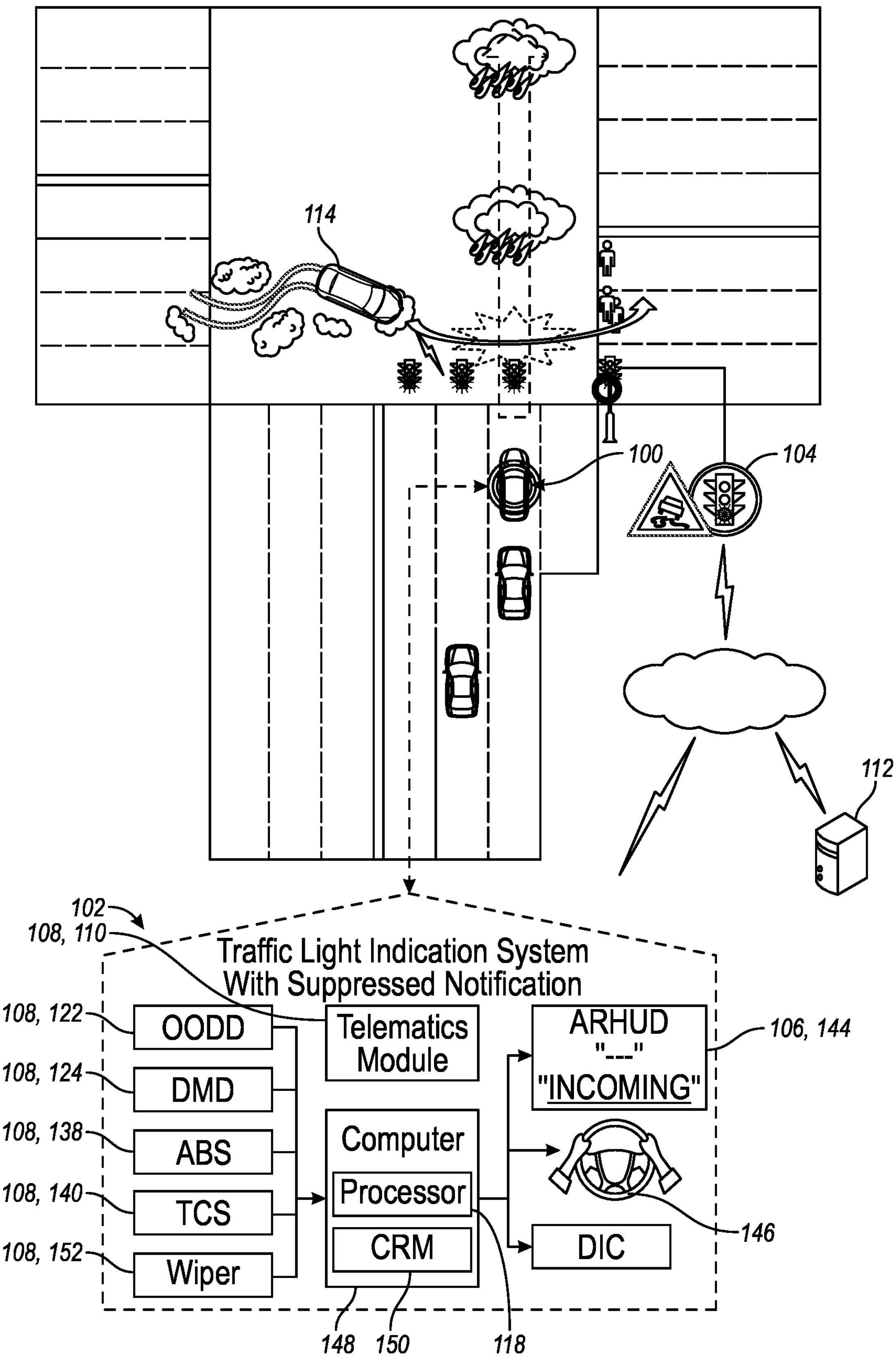
FIG. 6 is a schematic view of one example of the vehicle of FIG. 1, illustrating the system suppressing the traffic light notification in response to the system determining a hazardous driving condition in the form of another vehicle approaching a path of the vehicle during inclement weather.

Referring to FIGS. 4-6, in another non-limiting example, the input devices 108 may generate the overriding input signal, with the overriding input signal being a V2X message associated with a vehicle message transmitted from the telematics module 110 to the processor 118. The vehicle message may be associated with a location of a third party vehicle 100, a heading of the third party vehicle 100, a speed of the third party vehicle 100, an acceleration of the third party vehicle 100, and a predicted collision with the vehicle 100 based on the heading and the location of the third party vehicle 100. The OODD 122 may generate the overriding input signal, with the overriding input signal being associated with data indicating a location of the third party vehicle 100 relative to the vehicle 100, a heading of the third party vehicle 100 relative to the vehicle 100, a speed of the third party vehicle 100 relative to the vehicle 100, an acceleration of the third party vehicle 100 relative to the vehicle 100, a wiper device of the third party vehicle and/or the vehicle 100 being activated, an anti-lock braking system 138 (ABS) of the third party vehicle 100 and/or the vehicle 100 being activated, a traction control system 140 (TCS) of the third party vehicle and/or the vehicle 100 being activated and/or a predicted collision with the vehicle 100 based on the heading and the location of the third party vehicle 100 relative to the vehicle 100 among other examples.

As shown in FIG. 4, the third party vehicle 100 may be an Emergency Vehicle 142 (EV) that is approaching the path of the vehicle 100. The status input signal may be associated with data indicating that traffic light 104 is displaying a green light for the vehicle 100. The overriding input signal may be associated with data indicating that the EV 142 is travelling at a measured velocity and heading toward the path of the vehicle 100 with an emergency siren and emergency lights being activated.

As shown in FIG. 5, the third party vehicle 100 may be one or more Remote vehicles 114 (RV) located within the path of the vehicle 100. The status input signal may be associated with data indicating that traffic light 104 is displaying a green light for the vehicle 100. The overriding input signal may be the RV message associated with data indicating that the RVs 114 are spillover from a downstream intersection (e.g., in heavily congested traffic etc.), which are located in or approaching the path of the vehicle 100.

As shown in FIG. 6, the third party vehicle 100 may be a Remote Vehicle 100' headed toward the path of the vehicle 100. The status input signal may be associated with data indicating that traffic light 104 is displaying a green light for the vehicle 100. The overriding input signal may be associated with data indicating that a wiper device of the RV 114' and/or the vehicle 100 is activated, an ambient temperature, and/or a velocity of the RV' and/or the vehicle 100.

The system 102 further includes the notification device 106 for providing a traffic light notification to the user. The notification device 106 may include an Augmented Reality Head Up Display 144 (ARHUD) for displaying the traffic light notification. For example, the ARHUD 144 may display a real-time countdown for the amount of time that a traffic light remains one color before changing to another color (e.g., the real-time countdown can display that the traffic light will remain green for 15 seconds before the traffic light changes to amber.) The countdown may facilitate the user with determining that the vehicle may travel through the green light while maintaining or increasing the current velocity of the vehicle 100, based on the distance D from the traffic light 104 and the mass of the vehicle 100. Alternatively, the countdown may facilitate the user with determining that that the vehicle 100 may not travel through the green light before the countdown expires, such that the user applies the brake to avoid running through a red light. The notification device 106 may further include a haptic steering wheel 146 for providing a haptic alert to indicate to the user that the notification will imminently change color and/or has already completed change from one color to another color. For example, the haptic steering wheel 146 may provide the haptic alert when the traffic light changed from red to green, the velocity of the vehicle 100 remains zero and/or the system 102 does not detect RVs 114 in front of the host vehicle 100. In other non-limiting examples, the notification device 106 may be a speaker that provides an audible chime, voice command, among other examples.

The system 102 further includes a computer 148 having one or more processors 118 electronically connected to the input devices and the notification devices 106. The computer 148 further includes a non-transitory computer readable storage medium 150 (CRM) storing instructions, such that the processor 118 is programmed to receive the status input signal and the overriding input signal from the input devices 108. The processor 118 may determine the current status of the traffic light 104 and the amount of time that the traffic light 104 remains in one color before changing to another color, in response to the processor wirelessly receiving the status input signal from a remote server 112 that controls the traffic light 104.

The processor 118 is further programmed to generate an actuation signal based on the status input signal. The notification device 106 provides the traffic light notification to the user, in response to the notification device 106 receiving the actuation signal from the processor 118. In the non-limiting example of FIG. 1, the ARHUD 144 may display the real-time countdown for the amount of time that a traffic light remains one color before changing to another color.

The processor 118 is further programmed to determine a predicted collision with the vehicle 100, in response to the processor 118 receiving the status input signal from the remote server 112 via the telematics module 110. The processor 118 further determines the predicted collision with the vehicle 100, in response to the processor receiving the overriding input signal from the input device 108. Based on the overriding input signal, the processor 118 may determine that: the velocity is below a velocity threshold; the change in the brake pedal position is below a brake pedal threshold; the change in the accelerator pedal position is above an accelerator pedal threshold; and/or the rate of change in the steering wheel angle position is below a steering rate threshold, among other examples.

As shown in the non-limiting example of FIG. 2, the processor 118 may determine the predicted collision between the vehicle 100 and the VRU 116, in response to the processor 118 receiving the status input signal (e.g., associated with data indicating that the traffic light displays the green light to prompt the user to drive the vehicle along the path) and the overriding input signal (e.g., associated with data indicating the location of the crosswalk 120, the location of the VRU relative to the crosswalk 120, the speed of the VRU, the heading of the VRU, and/or the pedestrian signal light status, etc.). The processor 118 may also determine the predicted collision between the vehicle and the VRU 116, in response to the processor receiving the overriding input signal (e.g., associated with data indicating a location of the VRU relative to the vehicle 100, a heading of the VRU relative to the vehicle 100, and/or a range rate of the VRU relative to the vehicle, etc.) from the OODD 122 (e.g., the short range radar sensor, the LiDAR sensor, the MWR sensor, the IR camera, the stereo vision camera, etc.).

The processor 118 may determine the predicted collision with the vehicle 100, in further response to the processor 118 receiving the overriding input signal from the DMD 124. The overriding input signal may be the associated with data indicating that the user is operating the vehicle to intentionally disregard the status of the traffic light to avoid the predicted collision (e.g., the user gaze being directed toward the overriding road condition; the velocity of the vehicle 100 being associated with a braking distance threshold that is less than a distance between the vehicle and the overriding road condition; the brake pedal position changing to apply increasing a braking force; the accelerator pedal position changing to decrease propulsion, and/or the rate of change in the steering wheel angle position being increased to avoid the overriding road condition, among other examples).

As shown in the non-limiting example of FIG. 3, the processor 118 may determine the predicted collision between the vehicle 100 and the lane closure 130, in response to the processor 118 receiving the status input signal (e.g., associated with data indicating that the traffic light displays the green light to prompt the user to drive the vehicle 100 along the path) and the overriding input signal. The overriding input signal may be the V2X message in the form of the RS message associated with data indicating the presence of the lane closure 130 (e.g., one or more construction barrels, traffic cones, roadside flares, road barricades, construction equipment, utility vehicles, emergency vehicles, one or more individuals within the work zone, such as construction workers, utility technicians, first responders, etc.). More specifically, the RS message may be associated with the work zone start location 126, the work zone end location 128, the lane closure 130, and/or the location of one or more workers 132, among other examples. The OODD 122 may generate the overriding input signal, with the overriding input signal being associated with data indicating the location of the construction sign 134, the construction barrel 136, the locations of the workers 132 relative to the vehicle 100, and/or a heading of the workers 132 relative to the vehicle 100 among other examples.

As shown in the non-limiting example of FIG. 4, the processor 118 may determine the predicted collision between the vehicle 100 and the EV 142, in response to the processor 118 receiving the status input signal and the overriding input signal. The overriding input signal may be the V2X message in the form of the EV message associated with data indicating the EV 142 is approaching the path of the vehicle 100. The overriding input signal may be further associated with data indicating, among other examples, that the EV 142 is travelling with an emergency siren and emergency lights being activated and is heading toward the path of the vehicle 100 at a measured velocity such that the EV is unable to stop before colliding with the vehicle 100.

As shown in the non-limiting example of FIG. 5, the processor 118 may determine the predicted collision between the vehicle 100 and multiple RVs 114 located in the path of the vehicle 100, in response to the processor 118 receiving the status input signal (e.g., associated with data indicating that the traffic light displays the green light to prompt the user to drive the vehicle along the path) and the overriding input signal [e.g., the RV message associated with data indicating that the RVs 114 are spillover from a downstream intersection (e.g., in heavily congested traffic etc.), which are located in or approaching the path of the vehicle 100].

As shown in the non-limiting example of FIG. 6, the processor 118 may determine the predicted collision between the vehicle 100 and the RV 114 approaching the path of the vehicle 100, in response to the processor 118 receiving the status input signal (e.g., associated with data indicating that the traffic light displays the green light to prompt the user to drive the vehicle along the path) and the overriding input signal (e.g., associated with data indicating that a wiper device 152 of the RV 114' and/or the vehicle 100 is activated, an ambient temperature is below a freezing temperature, and/or a velocity of the RV' and/or the vehicle 100 being associated with a braking distance that is more than the distance from an associated one of the RV 114' and the vehicle 100 from a predicted collision site).

The processor 118 is further programmed to refrain from generating the actuation signal, in response to the processor 118 determining the predicted collision with the vehicle 100. As a result, the notification device 106 does not provide the traffic light notification, such that the user may focus attention on the hazardous driving condition (e.g., the predicted collision). The suppressed notifications can further result in decreased consumption of user device resources (e.g., battery resources, processing resources, and/or memory resources) and/or network resources (e.g., time domain resources and/or frequency domain resources) used to maintain the countdowns and notifications.

In another non-limiting example, the processor 118 may be further programmed to generate a warning signal, in response to the processor 118 determining the predicted collision with the vehicle 100. The notification device 106 (e.g., the ARHUD 144) may provide a hazard notification (e.g., "VRU" for FIG. 2, "WORK ZONE" for FIG. 3, "INCOMING" for FIG. 4, "TRAFFIC JAM" for FIG. 5, "INCOMING" for FIG. 6, and the like) to instruct the user to focus attention on the hazardous driving condition.

Figure 7:
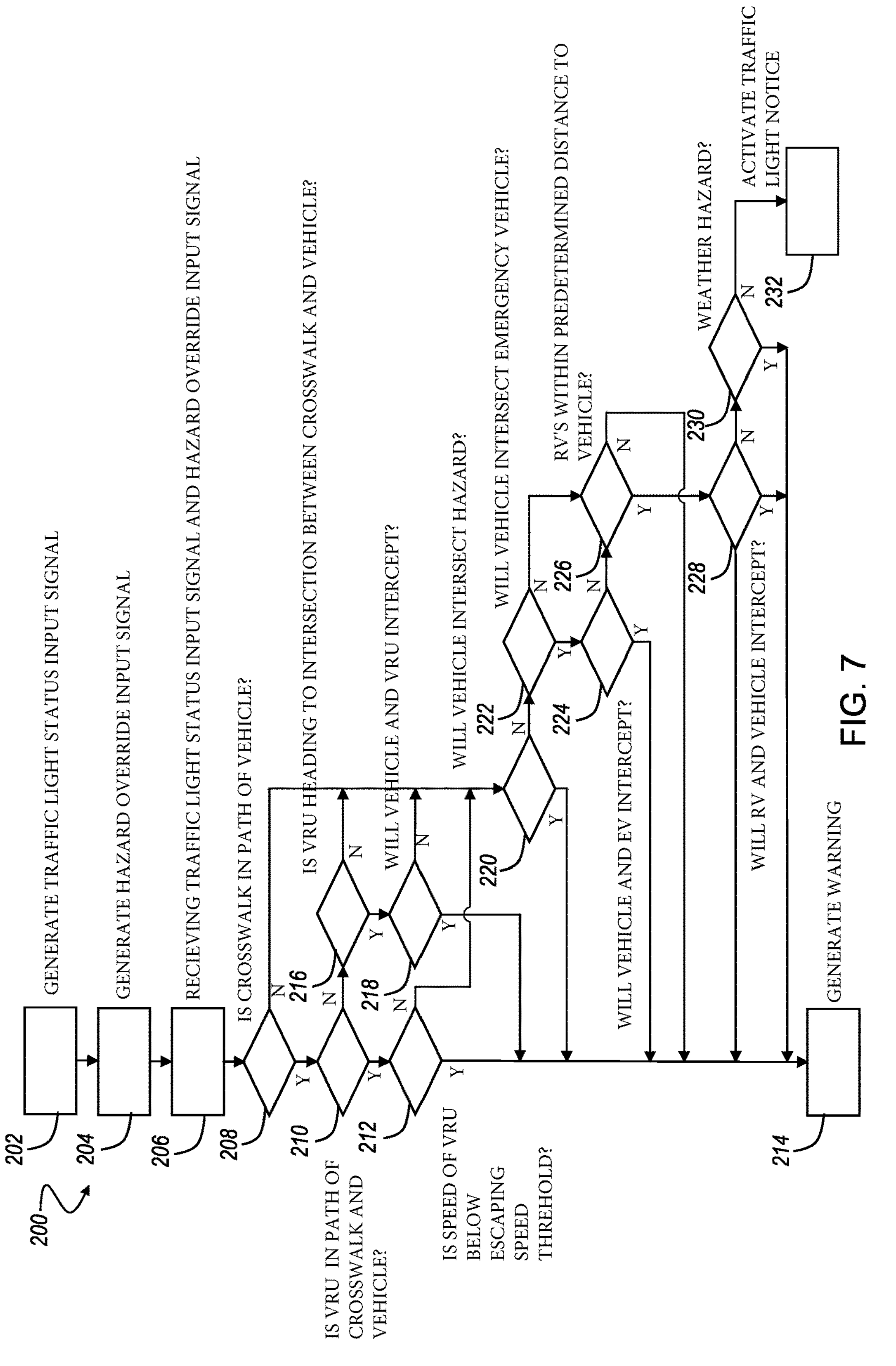
FIG. 7 is a flow chart of one example of a method of operating the system of FIG. 1.

Referring to FIG. 7, a method 200 is provided for operating the system 102 of FIG. 1. The method 200 begins at block 202 with generating, using one or more input devices 108, the status input signal associated with the status of the traffic light 104.

At block 204, the method 200 further includes generating, using one or more input devices, the overriding input signal associated with the hazardous driving condition.

At block 206, the method 200 further includes receiving, with the processor 118 of the computer 148, the status input signal and the overriding input signal from the associated input devices 108.

The method 200 further includes determining, using the processor 118, a predicted collision with the vehicle 100 based on the status input signal and the overriding input signal. More specifically, in this non-limiting example, this may be accomplished by multiple blocks (e.g., blocks 208-212 and blocks 216-230) where the processor 118 compares measured data to thresholds. The measured data may be associated with the vehicle 100, the user, the VRUs, the lane closure 130, the EV 142, the RVs 114, 114', and the vehicle components associated with the weather (e.g., the ABS 138, the TCS 140, the wiper device 152, etc.) among other examples.

At block 208, the method 200 further includes comparing, using the processor 118, a location of the crosswalk 120 to a path of the vehicle 100, which is predicted by the processor 118 based on the input signal. The method 200 proceeds to block 210, in response to the processor 118 determining that the crosswalk 120 is positioned within the predicted path of the vehicle 100. The method 200 proceeds to block 220 in response to the processor 118 determining that the crosswalk 120 is not positioned within the predicted path of the vehicle 100.

At block 210, the method further includes comparing, using the processor 118, the location of the crosswalk 120 to a location of the VRU 116. The method 200 proceeds to block 212, in response to the processor 118 determining that the VRU 116 is within a predetermined distance from an intersection between the crosswalk 120 and the predicted path of the vehicle 100. The method 200 proceeds to block 216, in response to the processor 118 determining that the VRU 116 is not within a predetermined distance from the intersection between the crosswalk 120 and the predicted path of the vehicle 100.

At block 212, the method 200 further includes comparing, using the processor 118, the speed of the VRU 116 to a VRU speed threshold. The method 200 proceeds to block 214, in response to the processor 118 determining that the speed of the VRU 116 is below the escaping speed threshold (e.g., where the VRU is travelling at a speed such that the vehicle will collide with the VRU, etc.). The method 200 proceeds to block 220, in response to the processor 118 determining that the speed of the VRU 116 is above the escaping speed threshold (e.g., where the VRU is travelling at a speed such that the vehicle will miss the VRU, etc.).

At block 214, the method 200 further includes determining, using the processor 118, the predicted collision with the vehicle (e.g., the collision between the vehicle 100 and the VRU 116) and refraining from, using the processor 118, generating the actuation signal. In other non-limiting examples, the method may further include generating, using the processor 118, the warning signal, such that the notification device 106 may provide the hazardous driving notification (e.g., the ARHUD 144 displaying "VRU" for FIG. 2, "WORK ZONE" for FIG. 3, "INCOMING" for FIG. 4, "TRAFFIC JAM" for FIG. 5, "INCOMING" for FIG. 6, and the like) to the user.

At block 216, the method 200 further includes comparing, using the processor 118, the heading of the VRU 116 to a location of the intersection between the crosswalk 120 and the predicted path of the vehicle 100. The method 200 proceeds to block 218, in response to the processor 118 determining that the VRU 116 is heading toward the intersection between the crosswalk 120 and the predicted path of the vehicle 100. The method 200 proceeds to block 220, in response to the processor 118 determining that the VRU 116 is not heading toward the intersection between the crosswalk 120 and the predicted path of the vehicle 100.

At block 218, the method 200 further includes comparing, using the processor 118, the speed of the VRU 116 and the distance between the VRU 116 and the predicted path of the vehicle 100. The method 200 proceeds to block 214, in response to the processor 118 determining that the VRU and the vehicle will intercept one another based on the speed of the VRU 116, the speed of the vehicle 100, the distance between the VRU 116 and the predicted collision site, the distance between the vehicle 100 and the predicted collision site, and the like. The method 200 proceeds to block 220, in response to the processor 118 determining that the VRU and the vehicle will not intercept one another.

At block 220, the method 200 further includes comparing the predicted path of the vehicle 100 to the work zone start location 126, the work zone end location 128, the lane closure 130, and/or the location of one or more workers 132. The method 200 proceeds to block 214 where the notification device 106 refrains from providing the traffic light notification, in response to the processor 118 determining that the predicted path of the vehicle 100 intersects with any portion of the lane closure 130 and/or one or more workers 132. The method 200 proceeds to block 222, in response to the processor 118 determining that the predicted path of the vehicle 100 does not intersect with any portion of the lane closure 130 and/or one or more workers 132.

At block 222, the method 200 further includes comparing, using the processor 118, the emergency siren and the emergency lights of the EV 142 to a predetermined status. The method 200 further includes comparing the heading of the EV 142 to the predicted path of the vehicle 100. The method 200 proceeds to block 224, in response to the processor 118 determining that the EV 142 is headed toward the predicted path of the vehicle 100 with the emergency siren and the emergency lights being activated. The method 200 proceeds to block 226, in response to the processor 118 determining that the EV 142 is not headed toward the predicted path of the vehicle 100 and/or the emergency siren and the emergency lights are not activated.

At block 224, the method 200 further includes comparing, using the processor 118, the speed of the EV 142 and the distance between the EV 142 and the predicted path of the vehicle 100. The method 200 proceeds to block 214 where the notification device 106 refrains from providing the traffic light notification, in response to the processor 118 determining that the EV 142 and the vehicle 100 will intercept one another based on the speed of the EV 142, the speed of the vehicle 100, the distance between the EV 142 and the predicted collision site, the distance between the vehicle 100 and the predicted collision site, and the like. The method 200 proceeds to block 226, in response to the processor 118 determining that the EV 142 and the vehicle 100 will not intercept one another.

At block 226, the method 200 further includes comparing, using the processor 118, the location of the RVs 114 to the predicted path of the vehicle 100. The method 200 further includes comparing, using the processor 118, the location of the vehicle 100 relative to the predicted collision site. The method 200 further includes comparing, using the processor 118, the speed of the vehicle 100 to a vehicle speed threshold. The method 200 proceeds to block 214 where the notification device 106 refrains from providing the traffic light notification, in response to the processor 118 determining that: the RVs 114 are positioned within a predetermined distance from the predicted path of the vehicle 100, the vehicle 100 is positioned within a predetermined distance of the predicted collision site, and/or the vehicle 100 is travelling above the vehicle speed threshold. The method 200 proceeds to block 228, in response to the processor 118 determining that: the RVs 114 are not positioned within a predetermined distance from the predicted path of the vehicle 100, the vehicle 100 is not positioned within a predetermined distance of the predicted collision site, and/or the vehicle 100 is not travelling above the vehicle speed threshold.

At block 228, the method 200 further includes comparing, using the processor 118, the speed of the RVs 114 and the distances between the RVs 114 and the predicted path of the vehicle 100. The method 200 proceeds to block 214 where the notification device 106 refrains from providing the traffic light notification, in response to the processor 118 determining that the associated RVs 114 and the vehicle 100 will intercept one another based on the speed of the RVs 114, the speed of the vehicle 100, the distance between the RVs 114 and the predicted collision site, the distance between the vehicle 100 and the predicted collision site, and the like. The method 200 proceeds to block 230, in response to the processor 118 determining that the VRU and the vehicle will not intercept one another.

At block 230, the method 200 further includes comparing, using the processor 118, the ambient temperature to a freezing temperature. The method 200 further includes comparing, using the processor 118, the wiper device 152 of the RV 114 and/or the vehicle 100 to a predetermined wiper status. The method 200 further includes comparing, using the processor 118, the ABS 138 to a predetermined ABS status. The method 200 further includes comparing, using the processor 118, the TCS 140 of the RV 114 and/or the vehicle 100 to a predetermined traction control status. The method 200 proceeds to block 214 where the notification device 106 refrains from providing the traffic light notification, in response to the processor 118 determining that the wiper device 152 has been activated, the ambient temperature is below a freezing temperature, the ABS 138 has been activated, the TCS 140 has been activated, and the like. The method 200 proceeds to block 232, in response to the processor 118 determining that the wiper device 152 has not been activated, the ambient temperature is not below a freezing temperature, the ABS 138 has not been activated, the TCS 140 has not been activated, and the like.

At block 232, the method further includes generating, using the processor, the actuation signal based on the status input signal and providing, using the notification device 106, the traffic light notification (e.g., "15 seconds" before the light changes from green to red as shown in FIG. 1), in response to the notification device 106 receiving the actuation signal from the processor 118.

Computers and computing devices generally include computer executable instructions, where the instructions may be executable by one or more computing devices such as those listed above. Computer executable instructions may be compiled or interpreted from computer programs created using a variety of programming languages and/or technologies, including, without limitation, and either alone or in combination, JAVA, C, C++, MATLAB, SIMULINK, STATEFLOW, VISUAL BASIC, JAVA SCRIPT, PERL, HTML, TENSORFLOW, PYTORCH, KERAS, etc. Some of these applications may be compiled and executed on a virtual machine, such as the JAVA VIRTUAL MACHINE, the DALVIK virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

The processor 130 may be communicatively coupled to, e.g., via the vehicle communications module, more than one local processor, e.g., included in electronic processor units (ECUs) or the like included in the vehicle 100 for monitoring and/or controlling various vehicle components. The processor 130 is generally arranged for communications on the vehicle communications module via an internal wired and/or wireless network, e.g., a bus or the like in the vehicle 100, such as a controller area network (CAN) or the like, and/or other wired and/or wireless mechanisms. Via the vehicle communications module, the processor 130 may transmit messages to various devices in the vehicle 100 and/or receive messages from the various devices, e.g., vehicle sensors, actuators, vehicle components, a human machine interface (HMI), etc. Alternatively or additionally, in cases where the processor includes a plurality of devices, the vehicle communications network may be used for communications between devices represented as the computer in this disclosure. Further, various processors and/or vehicle sensors may provide data to the computer. The processor can receive and analyze data from sensors substantially continuously and/or periodically. Further, object classification or identification techniques can be used, e.g., in a processor based on lidar sensor, camera sensor, etc., data, to identify the lane markings, a type of object, e.g., vehicle, person, rock, pothole, bicycle, motorcycle, etc., as well as physical features of objects.

Memory may include a computer readable medium (also referred to as a processor readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above and are accessed via a network in any one or more of a variety of manners. A file system may be accessible from a computer operating system and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A vehicle comprising:

a traffic light indication system comprising:

at least one input device for generating a status input signal associated with a status of a traffic light, and the at least one input device for further generating an overriding input signal associated with a hazardous driving condition;

at least one notification device for providing a traffic light notification to a user; and a computer comprising at least one processor electronically connected to the at least one input device and the at least one notification device, and the computer further comprising a non-transitory computer readable storage medium (CRM) storing instructions such that the at least one processor is programmed to:

receive the status input signal and the overriding input signal from the at least one input device;

generate an actuation signal based on the status input signal;

determine a predicted collision with the vehicle based on the status input signal and the overriding input signal; and refrain from generating the actuation signal in response to the at least one processor determining the predicted collision with the vehicle; and where at least one notification device provides the traffic light notification to the user, in response to the at least one notification device receiving the actuation signal from the at least one processor, and wherein the at least one input device comprises a telematics module, and the overriding input signal comprises a Vehicle-To-Everything message (V2X message) associated with a Personal Safety message (PS message) transmitted from the telematics module to the at least one processor, with the PS message being associated with at least one of:

a location of a crosswalk;

a location of a Vulnerable Road User (VRU) relative to the crosswalk;

a speed of the VRU;

a heading of the VRU; and a pedestrian signal light status.

2. The vehicle of claim 1 wherein the at least one input device further comprises an onboard objection detection device (OODD) generating the overriding input signal, with the overriding input signal being associated with data indicating at least one of:

a location of the VRU relative to the vehicle;

a heading of the VRU relative to the vehicle; and a range rate of the VRU relative to the vehicle.

3. The vehicle of claim 2 wherein the OODD comprises at least one of a short range radar sensor, a Light Detection and Ranging sensor (LiDAR sensor), a Millimeter-Wave Radar sensor (MWR sensor), an infrared camera (IR camera), and a stereo vision camera.

4. The vehicle of claim 2 wherein the at least one input device further comprises a driver monitoring device for generating the overriding input signal, with the overriding input signal being associated with data indicating a direction of a user gaze relative to at least one of the traffic light and the VRU, and the at least one processor is configured to refrain from generating the actuation signal in response to the at least one processor determining that the direction of the user gaze is toward at least one of the traffic light and the VRU based on the overriding input signal.

5. The vehicle of claim 4 wherein the overriding input signal is associated with a velocity of the vehicle, with the at least one processor determining the predicted collision with the vehicle in response to the at least one processor determining that the velocity is below a velocity threshold.

6. The vehicle of claim 4 wherein the overriding input signal is associated with a change in a brake pedal position, with the at least one processor determining the predicted collision with the vehicle in response to the at least one processor determining that the change in the brake pedal position is below a brake pedal threshold.

7. The vehicle of claim 4 wherein the overriding input signal is associated with a change in an accelerator pedal position, with the at least one processor determining the predicted collision with the vehicle in response to the at least one processor determining that the change in the accelerator pedal position is above an accelerator pedal threshold.

8. The vehicle of claim 4 wherein the overriding input signal is associated with a rate of change in a steering wheel angle position, with the at least one processor determining the predicted collision with the vehicle in response to the at least one processor determining that the rate of change in the steering wheel angle position is below a steering rate threshold.

9. The vehicle of claim 4 wherein the overriding input signal comprises the V2X message associated with a Road Safety Message (RS message) transmitted from the telematics module to the at least one processor, with the RS message being associated with at least one of:

a work zone start location;

a work zone end location;

a lane closure; and
a location of a worker.

10. The vehicle of claim 9 wherein the OODD generates the overriding input signal, with the overriding input signal being associated with data indicating at least one of:
a location of at least one of a construction sign, a construction barrel, and the worker relative to the vehicle; and
a heading of the worker relative to the vehicle.

11. The vehicle of claim 10 wherein the overriding input signal comprises the V2X message associated with a vehicle message transmitted from the telematics module to the at least one processor, with the vehicle message being associated with at least one of:
a location of a third party vehicle;
a heading of the third party vehicle;
a speed of the third party vehicle;
an acceleration of the third party vehicle; and
a predicted collision with the vehicle based on the heading and the location of the third party vehicle.

12. The vehicle of claim 11 wherein the OODD generates the overriding input signal, with the overriding input signal being associated with data indicating at least one of:
a location of the third party vehicle relative to the vehicle;
a heading of the third party vehicle relative to the vehicle;
a speed of the third party vehicle relative to the vehicle;
an acceleration of the third party vehicle relative to the vehicle;
a wiper device of at least one of the third party vehicle and the vehicle being activated;
an anti-lock braking system of at least one of the third party vehicle and the vehicle being activated; and
a predicted collision with the vehicle based on the heading and the location of the third party vehicle relative to the vehicle.

13. The vehicle of claim 12 wherein the at least one notification device comprises at least one of an Augmented Reality Head Up Display device (ARHUD device) and a haptic steering wheel.

14. A computer for a traffic light indication system of a vehicle, the computer comprising:
at least one processor electronically connected to at least one input device of the traffic light indication system, with the at least one input device generating a status input signal associated with a status of a traffic light and an overriding input signal associated with a hazardous driving condition, the at least one processor being further electronically connected to at least one notification device of the traffic light indication system, with the at least one notification device providing a traffic light notification to a user; and
a non-transitory computer readable storage medium (CRM) storing instructions such that the at least one processor is programmed to:
receive a status input signal and an overriding input signal from the at least one input device;
generate an actuation signal based on the status input signal;
determine a predicted collision with the vehicle based on the status input signal and the overriding input signal; and
refrain from generating the actuation signal in response to the at least one processor determining the predicted collision with the vehicle; and
where at least one notification device provides a traffic light notification to the user, in response to the at least one notification device receiving the actuation signal from the at least one processor, and
wherein the overriding input signal comprises a Vehicle-To-Everything message (V2X message) associated with a Personal Safety message (PS message) transmitted from a telematics module to the at least one processor, with the PS message being associated with at least one of:
a location of a crosswalk;
a location of a Vulnerable Road User (VRU) relative to the crosswalk;
a speed of the VRU;
a heading of the VRU; and
a pedestrian signal light status.

15. The computer of claim 14 wherein the overriding input signal is associated with at least one of:
a location of the VRU relative to the vehicle;
a heading of the VRU relative to the vehicle; and
a range rate of the VRU relative to the vehicle.

16. A method of operating a vehicle having a traffic light indicating system, the method comprising:
generating, using at least one input device, a status input signal associated with a status of a traffic light;
generating, using the at least one input device, an overriding input signal associated with a hazardous driving condition;
transmitting, using the at least one input device in the form of a telematics module, to the at least one processor of a computer, with the overriding input signal comprising a Vehicle-To-Everything message (V2X message) associated with a Personal Safety message (PS message), and the PS message being associated with at least one of:
a location of a crosswalk;
a location of a Vulnerable Road User (VRU) relative to the crosswalk;
a speed of the VRU;
a heading of the VRU; and
a pedestrian signal light status
receiving, with the at least one processor of the computer, the status input signal and the overriding input signal from the at least one input device;
generating, using the at least one processor, an actuation signal based on the status input signal;
providing, using at least one notification device, a traffic light notification to a user in response to the at least one notification device receiving the actuation signal from the at least one processor;
determining, using the at least one processor, a predicted collision with the vehicle based on the status input signal and the overriding input signal;
refraining from generating, using the at least one processor, the actuation signal in response to the at least one processor determining the predicted collision with the vehicle; and
providing, using at least one notification device, the traffic light notification to the user in response to the at least one notification device receiving the actuation signal from the at least one processor.

17. The method of claim 16 further comprising:
transmitting, using the telematics module, the V2X message associated with a vehicle message to the at least one processor, with the vehicle message being associated with at least one of:
a location of a third party vehicle;
a heading of the third party vehicle;
a speed of the third party vehicle;

an acceleration of the third party vehicle; and
a predicted collision with the vehicle based on the heading and the location of the third party vehicle.

* * * * *